United States Patent [19]

Tanabe

[11] Patent Number: 5,517,267
[45] Date of Patent: May 14, 1996

[54] ELECTROMAGNETIC DEVICE FOR CAMERAS

[75] Inventor: Yoshiaki Tanabe, Yokohama, Japan

[73] Assignee: Nikon Corporation, Tokyo, Japan

[21] Appl. No.: 281,578

[22] Filed: Jul. 28, 1994

Related U.S. Application Data

[63] Continuation-in-part of Ser. No. 201,986, Feb. 25, 1994.

[30] Foreign Application Priority Data

| Mar. 12, 1993 | [JP] | Japan | ................................. 5-10783 |
| Aug. 4, 1993 | [JP] | Japan | ............................. 5-46638 U |

[51] Int. Cl.⁶ ........................ G03B 9/08; G03B 9/02; H01F 7/08
[52] U.S. Cl. ................ 354/234.1; 354/271.1; 335/271; 335/277
[58] Field of Search ............... 335/270, 271, 335/275, 276, 277; 354/234.1, 235.1, 271.1, 152

[56] References Cited

U.S. PATENT DOCUMENTS

| 3,664,251 | 5/1972 | Vincent | ......................... 335/271 X |
| 4,205,287 | 5/1980 | Shimizu et al. | ..................... 335/271 |
| 4,862,127 | 8/1989 | Lundstrom et al. | ............... 335/271 X |

FOREIGN PATENT DOCUMENTS

| 60-18803 | 6/1985 | Japan . |
| 64-34621 | 3/1989 | Japan . |

*Primary Examiner*—A. A. Mathews
*Attorney, Agent, or Firm*—Oliff & Berridge

[57] ABSTRACT

An electromagnetic device for cameras includes a yoke that has a contact surface and is attached to a base plate. An armature having a contact surface faces and is movable into contact with the contact surface of the yoke. An armature shaft has one end attached perpendicularly to the contact surface of the armature, and has a catch at its opposite end. An armature lever is freely movable on the shaft between the catch and the armature. A biasing member, such as a spring, biases the armature away from the yoke. A coil is provided on the yoke, and when in an excited state, causes the contact surface of the armature to come into contact with the contact surface of the yoke to magnetically adhere the armature to the yoke, and when in an unexcited state, disengages the armature from the yoke. The armature lever includes one or more openings, such as a circular hole and/or an elongated slot, that are used to apply an elastic adhesive between the armature lever and the armature.

30 Claims, 9 Drawing Sheets

ELECTROMAGNETIC DEVICE FOR CAMERAS

CROSS REFERENCE TO RELATED APPLICATION

This is a continuation-in-part of U.S. patent application Ser. No. 08/201,986, filed Feb. 25, 1994 to Yoshiaki Tanabe, the disclosure of which is incorporated herein by reference.

BACKGROUND OF THE INVENTION

1. Field of the Invention

The present invention relates to improvements in an electromagnetic device for cameras.

2. Description of Related Art

One type of known conventional electromagnetic device for cameras is disclosed in Japanese Laid-Open Application No. 64-34621. In addition, the use of elastic adhesives in electromagnetic devices for cameras has been disclosed in Japanese Laid-Open Applications Nos. 61-5766 (which corresponds to U.S. Pat. Nos. 4,205,287) and 60-18803.

An explanation of the device disclosed in Japanese Laid-Open Application No. 64-34621 is provided hereafter, with reference to FIGS. 3 through 5.

In FIG. 3, base plate 1 is provided with arcuate holes 1a and 1b, a shaft 3 and a positioning pin 4 that is fixed to the base plate 1. A yoke 2 is provided with a contact surface 2a, the yoke position being determined by the positioning pin 4, and being mounted on the base plate 1 by means of a fixing screw 5. A coil 6 is wrapped around the yoke 2, and windings 6a and 6b of the coil 6 are connected to a control circuit 7.

FIG. 4 is a cross section of the shaft 3 taken along the line 4—4 in FIG. 3. A cover plate 15, which is essentially parallel to the base plate 1, covers the shaft 3 and extends in a direction parallel to the surface of FIG. 3. The cover plate 15 is not shown in FIG. 3 in order to simplify the drawing. An armature lever 9 is fixed to a shaft bearing 8 so as to be able to rotate around the shaft 3. Pin 12 is fixed to the cover plate 15; one end 10a of a drive spring 10 is attached to the pin 12, while the other end 10b is restrained by a reset pin 16 (see FIG. 3). One end 11a of a reset spring 11 is connected to the bottom of a hole 13a in an armature shaft 13, while the other end 11b is restrained by the reset pin 16.

The armature shaft hole 13a is provided in a catch 13b of the armature shaft 13. The armature shaft 13 is inserted into a hole 9b in the armature lever 9, and is attached to an armature 14. The armature 14 is pushed to the right (in FIG. 3) by one end 11a of the reset spring 11, its contact surface 14a contacting the contact surface 2a of the yoke 2. The armature lever 9 also includes guiding tabs 9e (more clearly shown in FIG. 9) to prevent the armature 14 from rotating relative to armature lever 9. In this instance, the armature lever 9, the reset spring 11, the drive spring 10 and the reset pin 16 correspond to items 154, 157, 156 and 1a, respectively, in FIG. 1 of Japanese Laid-Open Application No. 64-34621.

In FIG. 3, the end 10b of the drive spring 10 and the end 11b of the reset spring 11 both are restrained by the reset pin 16, and because they are not in contact with the bent component 9a of the armature lever 9, no force is applied to the armature lever 9. This enables the armature lever 9 to freely assume a position between the catch 13b and the armature 14. FIG. 3 shows a case where the space between the armature lever 9 and the catch 13b is at a maximum.

Referring to FIG. 5, only those components that differ from FIG. 3 are explained. The FIG. 5 items that are the same as in FIG. 3 are indicated through the attachment of an apostrophe (') to their respective numbers. One end 10b' of the drive spring 10' and one end 11b' of the reset spring 11' are both in contact with the bent component 9a'. The reset pin 16' directly restrains the armature lever 9'. The armature 14' is pressed to the right (in FIG. 5) by the armature lever 9', and its contact surface 14a' contacts the contact surface 2a' of the yoke 2'. Accordingly, in this case the armature lever 9' is restricted to the position shown in FIG. 5 by the reset pin 16' and the armature 14'. In other words, in FIG. 5, the distance between the armature lever 9' and the catch 13b' is forced to its maximum. In this instance, the armature lever 9', the reset spring 11', the drive spring 10' and the reset pin 16' correspond to items 153, 155, 55 and 2b, respectively, in FIG. 1 of Japanese Laid-Open Application No. 64-34621.

As shown in FIG. 3, the armature 14 contacts the yoke 2 when the yoke 2 is excited by the control circuit 7. Subsequently, the reset pin 16 moves in a clockwise direction. The end 10b of the drive spring 10 and the end 11b of the reset spring 11 both rotate in a clockwise direction following the reset pin 16, but eventually come into contact with the bent component 9a.

In the case shown in FIG. 5, the armature 14' contacts to the yoke 2' when the yoke 2' is excited by the control circuit 7'. Subsequently, the reset pin 16' moves in a clockwise direction, but in this case the end 10b' of the drive spring and the end 11b' of the reset spring 11' already are in contact with the bent component 9a'. Because the actions from this point on are the same as in FIG. 3, reference will be made to FIG. 3 in providing further explanation.

The armature lever 9 rotates around the shaft 3 in a clockwise direction under the force of the drive spring 10 and the reset spring 11. When the armature lever 9 rotates by the amount of separation between the catch 13b and the armature 14, the armature lever 9 collides into the catch 13b, in a state shown in FIG. 6. Subsequently, when the yoke 2 is put into an unexcited state by the control circuit 7, the armature 14 rotates around the shaft 3 in a clockwise direction under the driving force of the drive spring 10. Furthermore, the arm 9c presses the pin 17 in a clockwise direction. This state is shown in FIG. 7.

Next, the conventional technology set forth in Japanese Laid-Open Applications Nos. 61-5766 (U.S. Pat. No. 4,205,287) and 60-18803 will be explained with reference to FIG. 8. This technology has a structure wherein an armature 114 is mounted around a shaft 113 that extends parallel to the contact surface 114a so as to be able to rotate. Contact surface 114a contacts the contact surface of a yoke 102. An elastic adhesive is applied as the component E between a bent component 109e of an armature lever 109 and the armature 114. The elastic adhesive E absorbs vibrations of a leaf spring (not shown), also located between bent component 109e and armature 114. This prevents the armature 114 and the yoke 102 from accidently separating when subjected to weak shock forces.

When the conventional technology set forth in Japanese Laid-Open Applications Nos. 61-5766 and 60-18803 and in U.S. Pat. No. 4,205,287 is directly applied to an electromagnetic device having the structure described in Japanese Laid-Open Application No. 64-34621, a number of problems arise, an explanation of which is provided hereafter, with reference to FIG. 9.

FIG. 9 is a drawing of the structure in FIG. 6, modified to incorporate the FIG. 8 technology, viewed in the direction indicated by arrow B in FIG. 6. When the conventional technology set forth in Japanese Laid-Open Applications Nos. 61-5766 and 60-18803 is directly applied to the FIG. 6 structure, the elastic adhesive is applied as components C and D in FIG. 9. In comparing FIGS. 8 and 9, one sees that the difference in structure is that the distance G in FIG. 8 is considerably larger than the distance F in FIG. 9. In the structure in FIG. 9, the contact surface 14a is next to the area of application when the elastic adhesive is applied as components C and D. Accordingly, there is the danger that during the process of applying the elastic adhesive, the elastic adhesive accidentally could be applied to the contact surface 14a.

In addition, generally with this type of electromagnetic device for cameras, there are many cases where the top and bottom are blocked by the base plate 1 and the cover plate 15, so that the task of applying the elastic adhesive must be done in the direction perpendicular to the surface of FIG. 9, with an accompanying reduction in work efficiency. On the other hand, the structure in FIG. 9 also has strong points that should not be eliminated from the design, such as the fact that the entire distance H can be made smaller because the distance F can be reduced.

SUMMARY OF THE INVENTION

An object of the present invention is to overcome the aforementioned problems, and to improve work efficiency without altering the structure of the electromagnetic device for cameras.

In order to achieve this and other objects, the electromagnetic device for cameras according to the present invention preferably includes an opening such as a circular hole and/or an elongated slot in an armature lever so that elastic adhesive can be applied between the armature lever and the armature. Preferably, the electromagnetic device also includes a yoke that has a contact surface and is attached to a base plate, the armature having a contact surface that opposes (i.e., faces) the contact surface of the yoke. An armature shaft, which has one end attached perpendicularly to the contact surface of the armature, includes a catch. The armature lever is mounted to move freely on the armature shaft between the armature and the catch. A biasing member biases the armature lever away from the yoke. A coil is provided on the yoke and, when excited, causes the contact surface of the armature to come into contact with the contact surface of the yoke to adhere (by magnetic attraction) the armature to the yoke, and when in an unexcited state, disengages the armature from the yoke. In the electromagnetic device for cameras having the structure outlined above, in which the elastic adhesive is applied between the armature lever and the armature by means of a circular hole and/or an elongated slot provided in the armature lever 9, an improvement in work efficiency can be realized without altering the structure of the electromagnetic device for cameras.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

A description of a preferred embodiment of the present invention is provided hereafter, with reference to the drawings.

Figure 1:
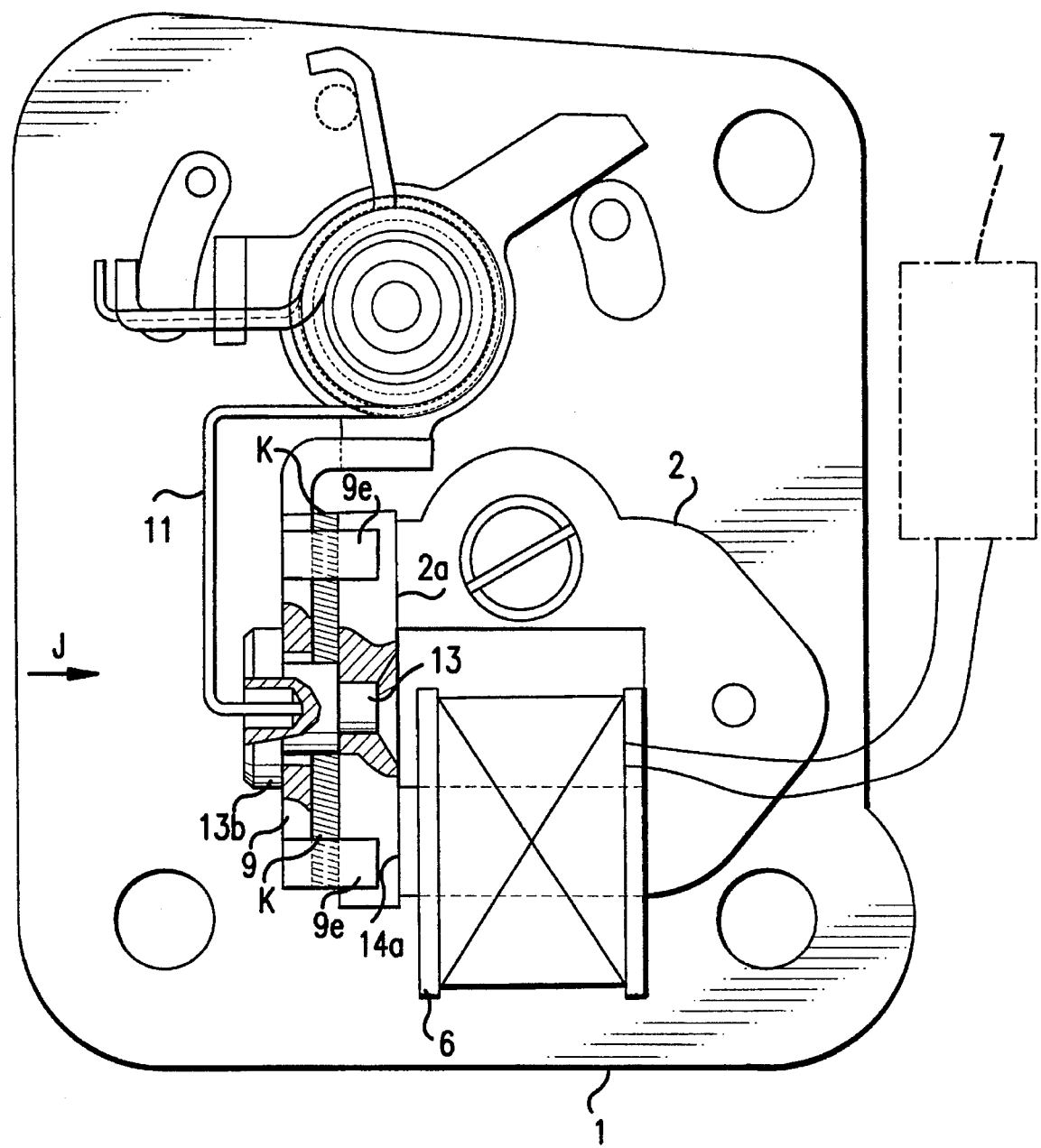
FIG. 1 is a top view of an embodiment of an electromagnetic device for cameras according to the present invention.
Figure 2:
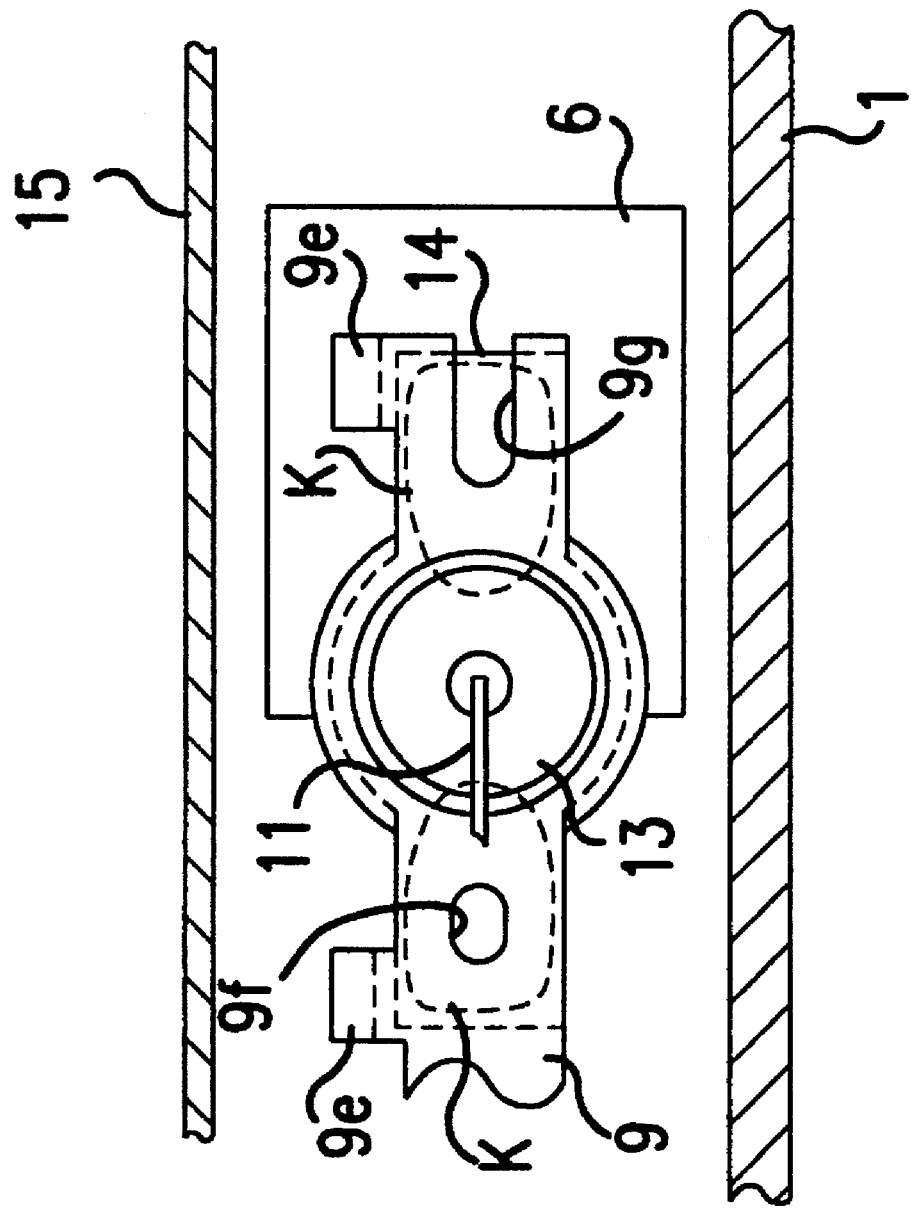
FIG. 2 is a side view of the FIG. 1 embodiment of an electromagnetic device for cameras according to the present invention.

FIGS. 1 and 2 are a top and a side view, respectively, of an embodiment of an electromagnetic device for cameras according to the present invention. In these figures, components that are the same as in FIGS. 3 through 5 are marked with comparable numbers, and a repeated explanation of such items is omitted.

In FIG. 1, an elastic adhesive such as, for example, silicone rubber adhesive, is applied as component K between the armature lever 9 and the armature 14. The application of this elastic adhesive is accomplished through a circular hole 9f and an elongated slot 9g, both in armature lever 9, in the manner described hereafter.

FIG. 2 is a side view of the structure in FIG. 1 as viewed in the direction indicated by arrow J in FIG. 1. In the armature lever 9 are formed a circular hole 9f and an elongated slot 9g. Through the circular hole 9f and the elongated slot 9g the elastic adhesive is applied as component K. It also would be possible for the circular hole 9f and the elongated slot 9g to both be in the form of holes, or conversely both be in the form of slots. Thus, at least one, and preferably, two, apertures, which could be a hole or a slot (or some other shape) is provided in armature lever 9 for application of elastic adhesive. In addition, it also is possible for the application of the elastic adhesive component K to be accomplished by pouring the elastic adhesive or through a different method.

Figure 3:
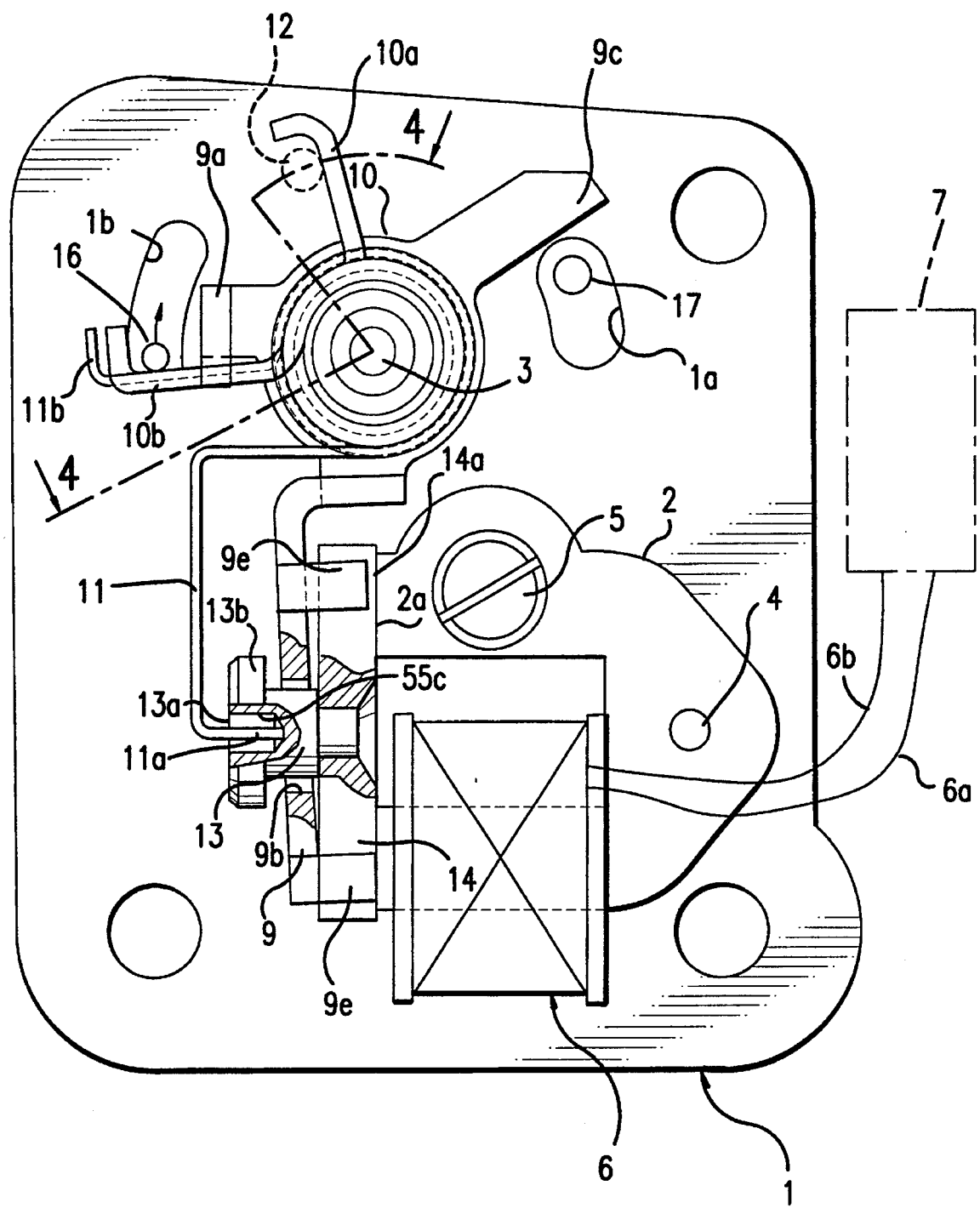
FIG. 3 is a top view of an example of a conventional electromagnetic device for cameras.
Figure 4:
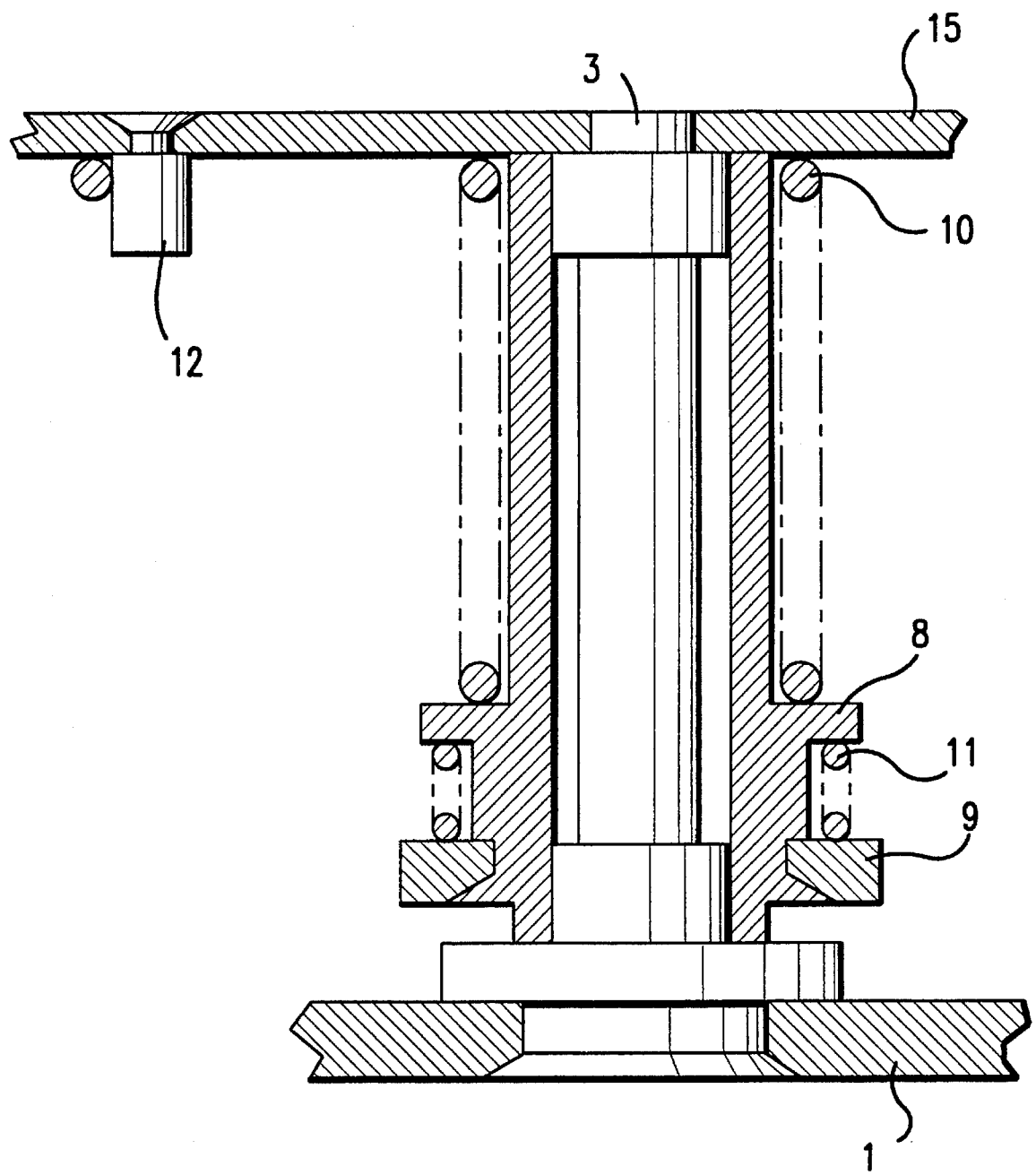
FIG. 4 is a side view of an example of a conventional electromagnetic device for cameras.
Figure 5:
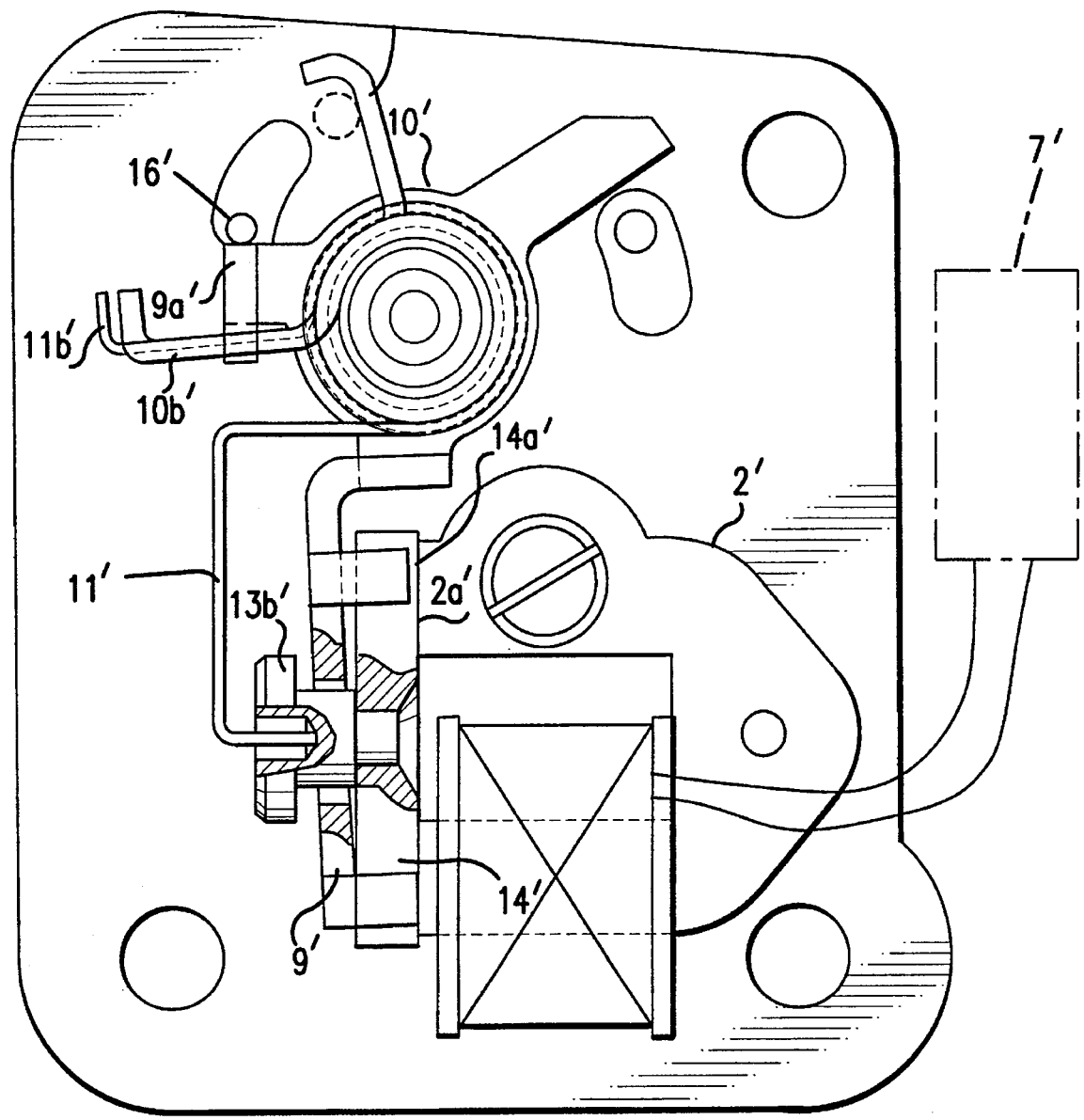
FIG. 5 is a top view of an example of a conventional electromagnetic device for cameras.
Figure 6:
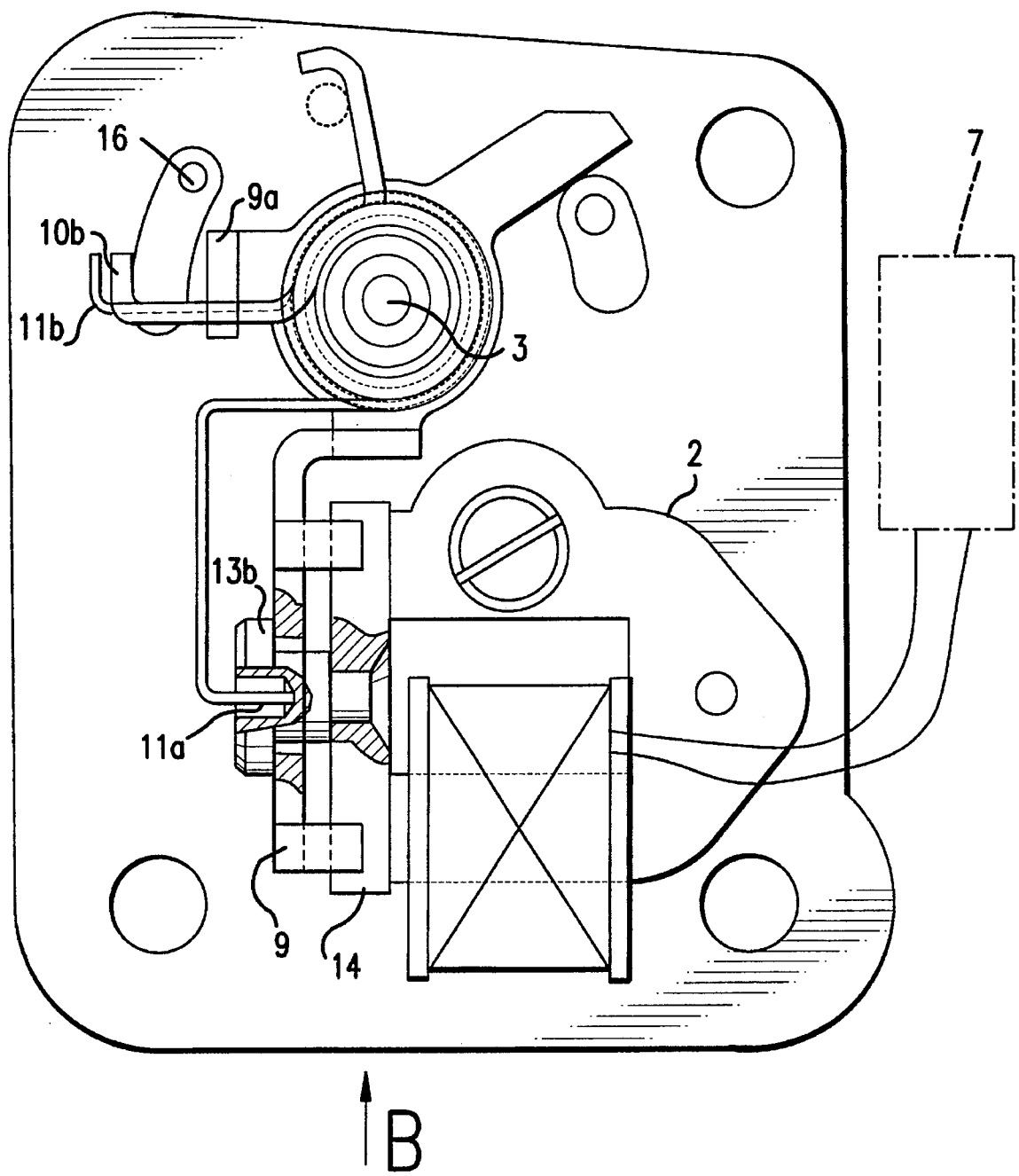
FIG. 6 is a top view of an example of a conventional electromagnetic device for cameras.
Figure 7:
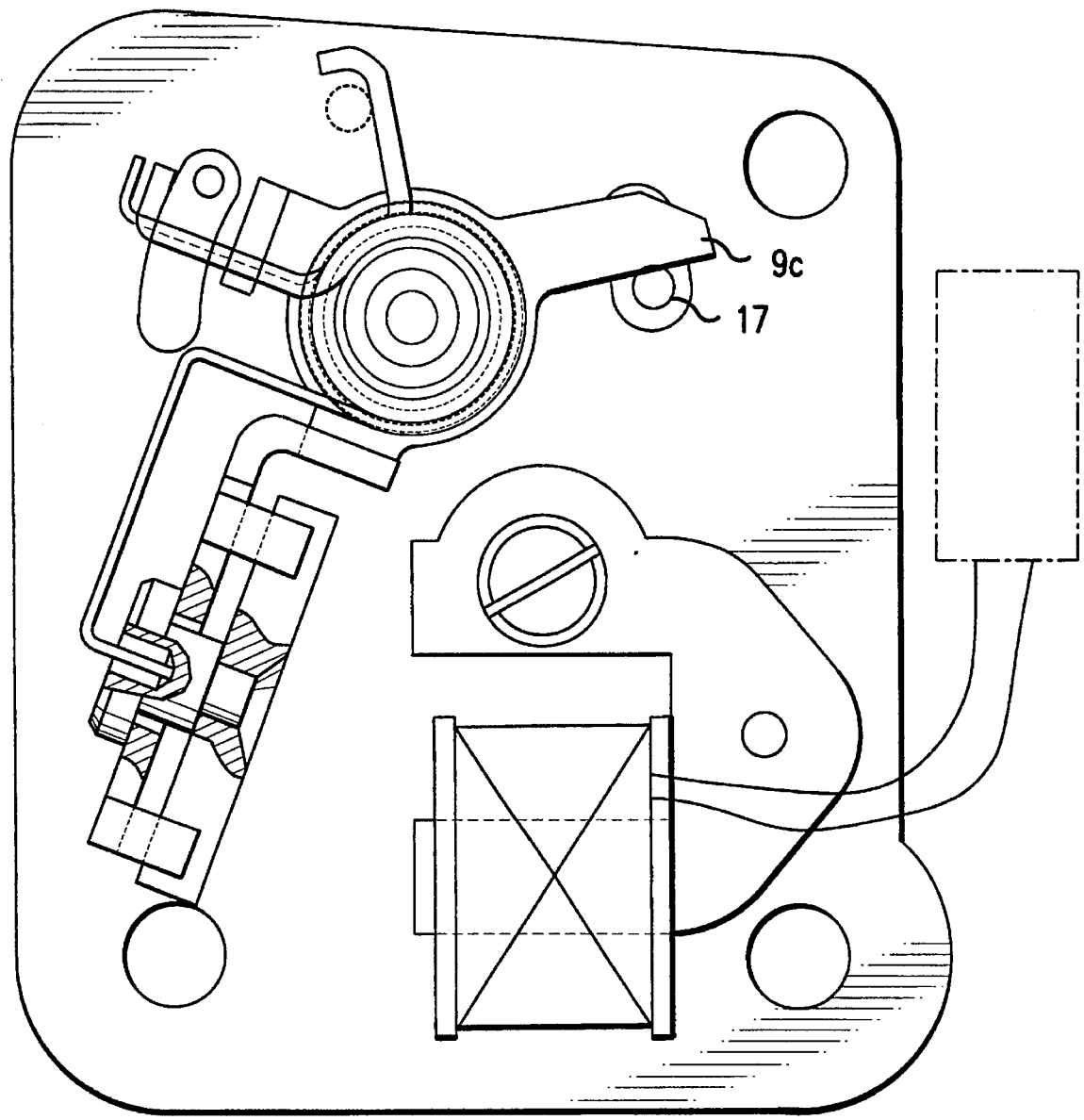
FIG. 7 is a top view of an example of a conventional electromagnetic device for cameras.
Figure 8:
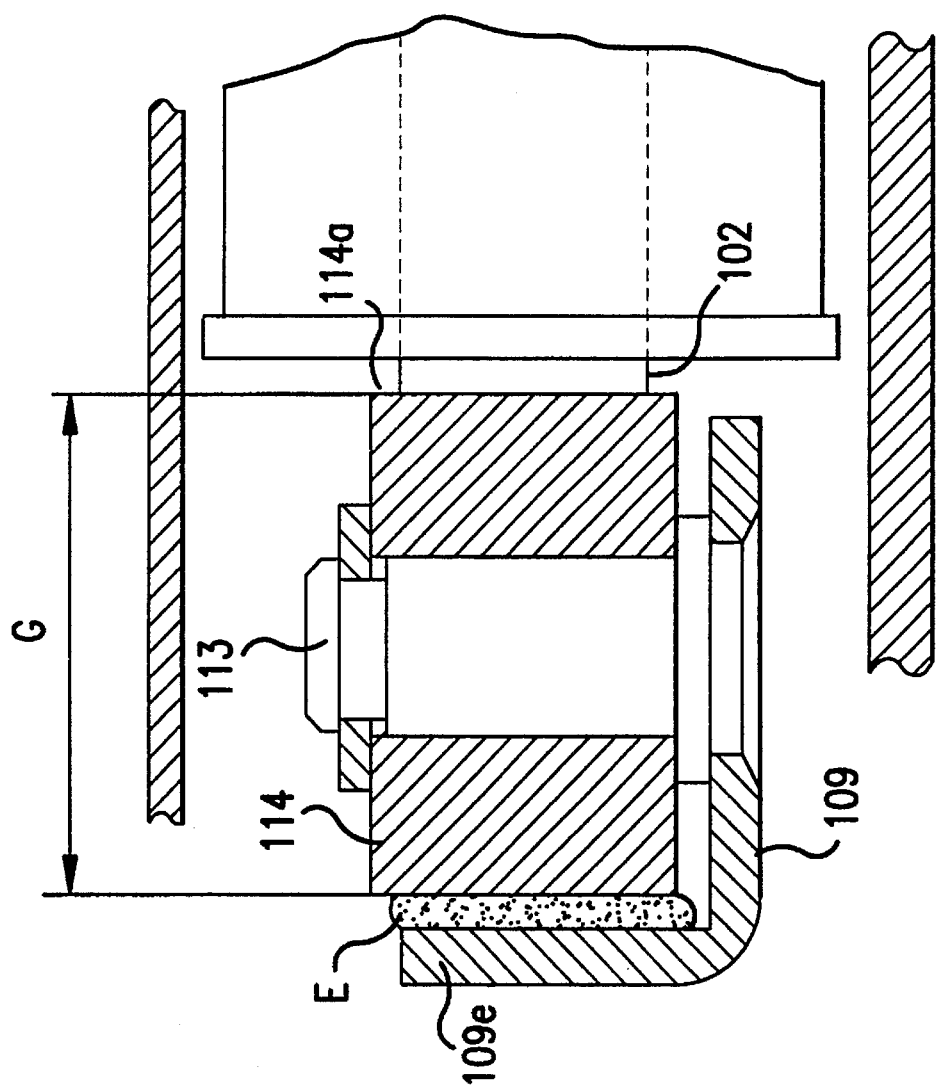
FIG. 8 is a side view of an example of a conventional electromagnetic device for cameras.
Figure 9:
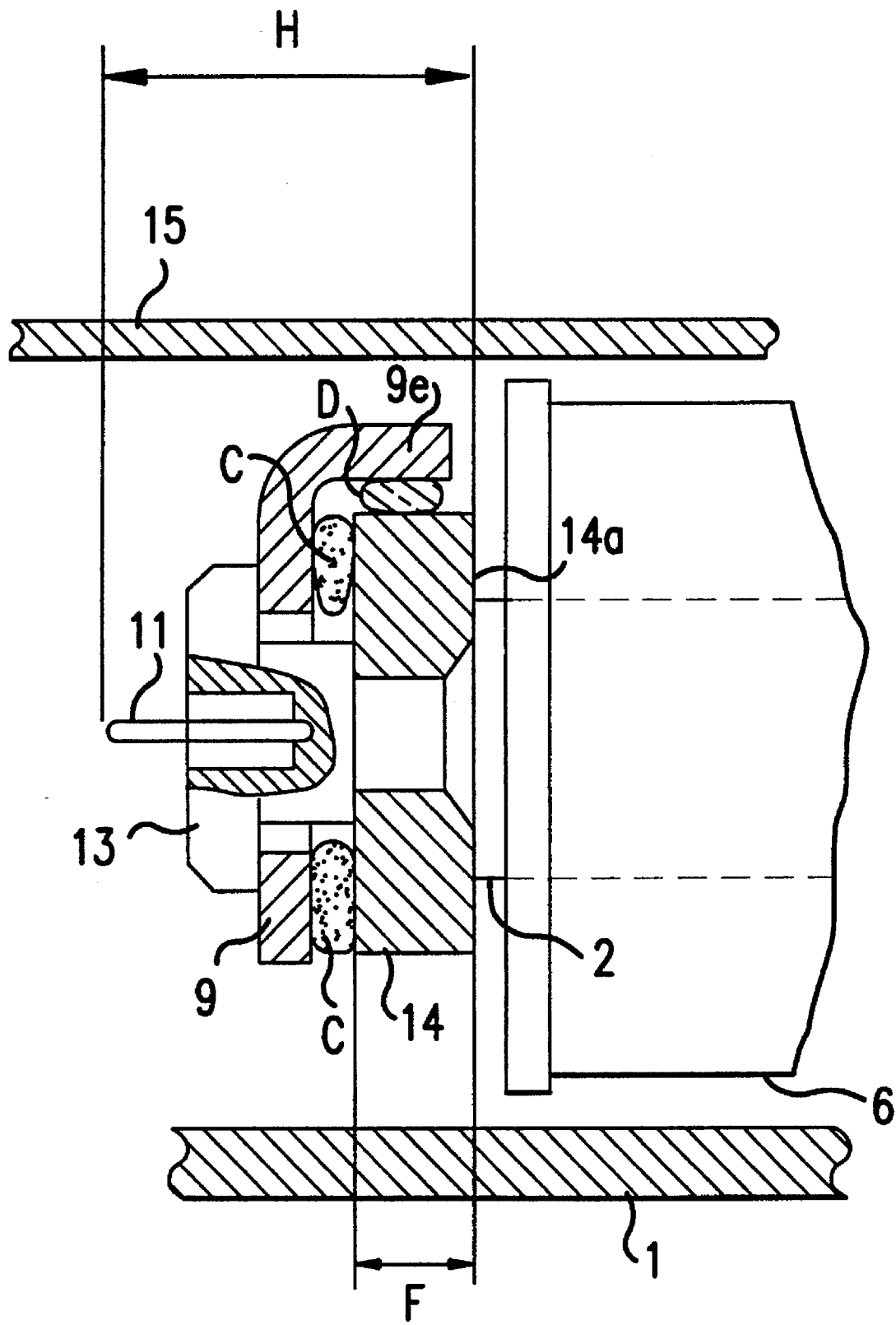
FIG. 9 is a side view of an example of the FIG. 6 conventional electromagnetic device for cameras modified to incorporate features of the FIG. 8 conventional electromagnetic device for cameras.

Because the operation of the present electromagnetic device is the same as in the conventional technology explained in FIGS. 3 through 5, a repeated explanation of the same is omitted.

With the above embodiment, a circular hole 9f and an elongated slot 9g are provided in the armature lever 9. Application of the elastic adhesive is made through the circular hole 9f and the elongated slot 9g, thus eliminating the danger of accidentally applying the elastic adhesive to the contact surface 14a. In addition, because the task of applying the elastic adhesive can be conducted from the direction indicated by arrow J in FIG. 1, the base plate 1 and cover plate 15 do not become hindrances, and the work efficiency is improved.

As explained above, with an electromagnetic device for cameras according to the present invention, elastic adhesive is applied to the space between the armature lever 9 and the armature 14 by means of a circular hole 9f and an elongated slot 9g provided in the armature lever 9. This results in an improvement in the work efficiency without altering the structure of the described electromagnetic device for cameras.

The disclosed embodiment in FIG. 1 had a structure similar to FIG. 3 in which the reset pin 16 contacted ends 10b, 11b of springs 10 and 11. The present invention also can be applied to a device having the FIG. 5 structure in which the reset pin 16 contacts bent portion 9a of armature lever 9.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An electromagnetic device for cameras, comprising:
   a yoke having a contact surface;
   an armature having a contact surface that opposes said yoke contact surface, said armature being movably mounted relative to said yoke so that said yoke contact surface and said armature contact surface can be selectively engaged and disengaged;
   an armature shaft having a first portion attached to said armature, said armature shaft having a catch spaced from said first portion;
   an armature lever mounted to move freely on said armature shaft between said first portion and said catch;
   a biasing member that applies a force to said armature lever to bias said armature lever away from said yoke and toward said catch;
   said armature lever including at least one opening for use in applying an elastic adhesive between said armature lever and said armature.

2. The device of claim 1, wherein said armature lever includes an aperture, said armature shaft extending through said aperture, and said at least one opening is located adjacent to said aperture.

3. The device of claim 2, wherein said at least one opening includes a first opening and a second opening located on opposite sides of said aperture.

4. The device of claim 3, wherein said first opening is a circular hole and said second opening is an elongated slot.

5. The device of claim 1, wherein said at least one opening includes a first opening and a second opening.

6. The device of claim 5, wherein said first opening is a circular hole and said second opening is an elongated slot.

7. The device of claim 1, wherein said at least one opening includes a circular hole.

8. The device of claim 1, wherein said at least one opening includes an elongated slot.

9. The device of claim 1, wherein said at least one opening includes an elongated slot located near an end of said armature lever.

10. The device of claim 9, wherein said at least one opening includes first and second openings, said first opening comprising said elongated slot, said second opening comprising a circular hole spaced from said end of said armature lever containing said elongated slot.

11. The device of claim 1, wherein said armature lever includes a bent portion, said biasing member is a spring that is movable into contact with said bent portion to bias said armature lever towards said catch, and further comprising a reset member engaged with said spring and movable to cause said spring to contact said bent portion and bias said armature lever.

12. The device of claim 1, further comprising an elastic adhesive applied through said at least one opening and located between said armature and said armature lever.

13. The device of claim 12, wherein said elastic adhesive is silicone rubber adhesive.

14. An electromagnetic device for cameras, comprising:
   a baseplate;
   a yoke mounted on said baseplate and having a contact surface;
   an armature having a contact surface that opposes said yoke contact surface;
   an armature shaft having a first end attached to said armature so as to extend perpendicularly to said armature contact surface, said armature shaft having a catch spaced from said first end;
   an armature lever slidably mounted on said armature shaft so as to be movable between said armature and said catch;
   a biasing member that applies a force to said armature lever to bias said armature lever away from said yoke and toward said catch;
   a coil provided on said yoke to selectively excite said yoke, when in an excited state, said armature lever being attracted toward said yoke causing said armature contact surface to come into contact with said yoke contact surface, and when in an unexcited state, said armature becoming disengaged from said yoke;
   said armature lever including at least one opening for use in applying an elastic adhesive between said armature lever and said armature.

15. The device of claim 14, wherein said armature lever includes an aperture, said armature shaft extending through said aperture, and said at least one opening is located adjacent to said aperture.

16. The device of claim 15, wherein said at least one opening includes a first opening and a second opening located on opposite sides of said aperture.

17. The device of claim 16, wherein said first opening is a circular hole and said second opening is an elongated slot.

18. The device of claim 14, wherein said at least one opening includes a first opening and a second opening.

19. The device of claim 18, wherein said first opening is a circular hole and said second opening is an elongated slot.

20. The device of claim 14, wherein said at least one opening includes a circular hole.

21. The device of claim 14, wherein said at least one opening includes an elongated slot.

22. The device of claim 14, further comprising an elastic adhesive applied through said at least one opening and located between said armature and said armature lever.

23. The device of claim 22, wherein said elastic adhesive is silicone rubber adhesive.

24. An electromagnetic device for cameras, comprising:
   a baseplate;
   a yoke mounted on said baseplate and having a contact surface;
   an armature having a contact surface that opposes said yoke contact surface;
   an armature shaft having a first end attached to said armature so as to extend perpendicularly to said armature contact surface, said armature shaft having a catch spaced from said first end;

an armature lever slidably mounted on said armature shaft so as to be movable between said armature and said catch;

a biasing member that applies a force to said armature lever to bias said armature lever away from said yoke and toward said catch;

a coil provided on said yoke to selectively excite said yoke, when in an excited state, said armature lever being attracted toward said yoke causing said armature contact surface to come into contact with said yoke contact surface, and when in an unexcited state, said armature becoming disengaged from said yoke;

said armature lever including a circular hole and an elongated slot for use in applying an elastic adhesive between said armature lever and said armature.

25. The device of claim 24, wherein said armature lever includes an aperture, said armature shaft extending through said aperture.

26. The device of claim 25, wherein said circular hole and said elongated slot are located on opposite sides of said aperture.

27. The device of claim 26, wherein said elongated slot is located near an end of said armature lever.

28. The device of claim 24, wherein said armature lever includes a bent portion, said biasing member is a spring that is movable into contact with said bent portion to bias said armature lever towards said catch, and further comprising a reset member engaged with said spring and movable to cause said spring to contact said bent portion and bias said armature lever.

29. The device of claim 24, further comprising an elastic adhesive applied through said circular hole and through said elongated slot and located between said armature and said armature lever.

30. The device of claim 29, wherein said elastic adhesive is silicone rubber adhesive.

* * * * *